United States Patent
Lee et al.

(10) Patent No.: US 10,877,196 B2
(45) Date of Patent: Dec. 29, 2020

(54) POLARIZER AND MANUFACTURING METHOD THEREOF

(71) Applicant: Samsung Display Co., Ltd., Yongin-si (KR)

(72) Inventors: Kyung Hee Lee, Suwon-si (KR); Jae Hong Park, Seoul (KR); Ji Yun Park, Hwaseong-si (KR); Hyung Guen Yoon, Hwaseong-si (KR); Jae Bok Chang, Incheon (KR)

(73) Assignee: Samsung Display Co., Ltd., Yongin-si (KR)

( * ) Notice: Subject to any disclaimer, the term of this patent is extended or adjusted under 35 U.S.C. 154(b) by 290 days.

(21) Appl. No.: 15/893,476

(22) Filed: Feb. 9, 2018

(65) Prior Publication Data
US 2019/0072700 A1    Mar. 7, 2019

(30) Foreign Application Priority Data
Sep. 5, 2017  (KR) .......................... 10-2017-0113442

(51) Int. Cl.
*G02B 5/30*   (2006.01)
(52) U.S. Cl.
CPC ......... *G02B 5/3041* (2013.01); *G02B 5/3016* (2013.01); *G02B 5/3033* (2013.01)
(58) Field of Classification Search
CPC .. G02B 5/3016; G02B 5/3033; G02B 5/3058; G02B 5/3041
USPC .......................... 359/485.05, 487.02, 487.03
See application file for complete search history.

(56) References Cited

U.S. PATENT DOCUMENTS

| | | | | |
|---|---|---|---|---|
| 7,638,796 B2* | 12/2009 | Kwak | ................ | H01L 51/5281 257/40 |
| 7,864,422 B2* | 1/2011 | Jung | .................... | H04N 13/359 359/463 |
| 8,080,309 B2 | 12/2011 | Shinohara et al. | | |
| 9,529,227 B2 | 12/2016 | Kim et al. | | |
| 10,591,768 B2* | 3/2020 | Yoon | ................ | G02F 1/133514 |
| 2005/0068476 A1* | 3/2005 | Okabe | ................ | B29D 11/0073 349/96 |
| 2014/0036200 A1* | 2/2014 | Jung | ................. | G02F 1/133536 349/61 |
| 2014/0073214 A1* | 3/2014 | Wu | ........................ | G02B 26/08 445/24 |
| 2016/0266292 A1 | 9/2016 | Kuzmin et al. | | |
| 2017/0184922 A1* | 6/2017 | Park | ................... | G02F 1/133707 |
| 2018/0348416 A1* | 12/2018 | Lee | ........................ | G02B 1/08 |
| 2018/0355181 A1* | 12/2018 | Yoon | ..................... | C09K 19/54 |

FOREIGN PATENT DOCUMENTS

| | | |
|---|---|---|
| JP | 2005-352320 A | 12/2005 |
| KR | 10-2006-0111478 A | 10/2006 |
| KR | 10-2015-0144631 A | 12/2015 |
| KR | 10-2018-0131717 A | 12/2018 |

* cited by examiner

*Primary Examiner* — Ricky D Shafer
(74) *Attorney, Agent, or Firm* — Lewis Roca Rothgerber Christie LLP (57) ABSTRACT

A polarizer and a manufacturing method of a polarizer are provided. The polarizer includes: an alignment layer including a cured liquid crystalline material and having a plurality of concave portions defined on its surface to extend in a first direction; and a polarizing material layer containing a dye and disposed on the surface of the alignment layer on which the concave portions are defined.

10 Claims, 13 Drawing Sheets

POLARIZER AND MANUFACTURING METHOD THEREOF

CROSS-REFERENCE TO RELATED APPLICATION

This application claims priority to and the benefit of Korean Patent Application No. 10-2017-0113442, filed on Sep. 5, 2017, in the Korean Intellectual Property Office, the content of which is incorporated herein by reference in its entirety.

BACKGROUND

1. Field

The present disclosure relates to a polarizer and a manufacturing method thereof.

2. Description of the Related Art

A polarizer is an element for converting incident light in an unpolarized state into light in a specific polarized state by transmitting a polarized component which oscillates in a direction parallel to a transmission axis and absorbing a polarized component which oscillates in a direction parallel to an absorption axis. By applying a polarizer having the polarization characteristics to a display device, the display device can have various optical functions.

For example, in a liquid crystal display device, a polarizer together with (e.g., in combination with) a liquid crystal layer can perform a shutter function to adjust the amount of light provided from a light source, thereby realizing an image display. In another example, a polarizer together with a phase retardation layer may convert light in an unpolarized state to light in a circularly polarized state, thereby suppressing display quality deterioration due to external light reflection.

SUMMARY

Aspects of the present disclosure are directed toward a polarizer capable of providing stable alignment by inducing alignment of a dye in a simple manner, and a manufacturing method thereof.

However, aspects of the present disclosure are not restricted to the ones set forth herein. The above and other aspects of the present disclosure will become more apparent to one of ordinary skill in the art to which the present disclosure pertains by referencing the detailed description of the present disclosure given below.

According to an embodiment, a polarizer includes: an alignment layer including a cured liquid crystalline material and having a surface including a plurality of concave portions, the plurality of concave portions extending in a first direction; and a polarizing material layer including a dye on the concave portions of the surface of the alignment layer.

The cured liquid crystalline material may be a polymer of liquid crystal monomers.

The liquid crystal monomers may include reactive end groups including an unsaturated bond.

The alignment layer may not include a dye.

The polarizing material layer may not include the liquid crystalline material.

The dye may be a dichroic dye.

Each of the concave portions may have a width of 100 nm or less.

Each of the concave portions may have a depth of 70 nm or more.

The plurality of concave portions may be arranged at regular intervals in a second direction perpendicular to the first direction.

The interval between the plurality of concave portions may be 100 nm or less.

According to an embodiment, a polarizer includes: a first alignment layer including a cured liquid crystalline material and a surface having a plurality of concave portions, the plurality of concave portions extending in a first direction; a first polarizing material layer including a dye on the concave portions of the surface of the first alignment layer; an intermediate layer on the first polarizing material layer; a second alignment layer on the intermediate layer, the second alignment layer including a cured liquid crystalline material and a surface having a plurality of concave portions, the plurality of concave portions extending in the first direction; and a second polarizing material layer including a dye on the concave portions of the surface of the second alignment layer.

The intermediate layer may include a water-soluble polymer material.

The dye included in one of the first polarizing material layer and the second polarizing material layer may include a yellow dye, a magenta dye and a cyan dye, or include a red dye, a green dye and a blue dye.

The dye included in an other one of the first polarizing material layer and the second polarizing material layer may be the same as at least one of the dyes included in the one of the first polarizing material layer and the second polarizing material layer.

The dye included in the first polarizing material layer may be different from the dye included in the second polarizing material layer.

According to an embodiment, a method of manufacturing a polarizer includes: applying a liquid crystal composition including liquid crystal monomers onto a base substrate; attaching a mold having a surface having a plurality of alternately formed concave portions and convex portions to the liquid crystal composition, the concave portions and the convex portions extending in a first direction, and the surface in contact with the liquid crystal composition; curing the liquid crystal composition attached to the mold to form a cured liquid crystal composition; detaching the mold from the cured liquid crystal composition; and coating a solution including a dye on the cured liquid crystal composition to form a polarizing material layer.

The liquid crystal monomers may include reactive end groups including an unsaturated bond, and wherein the curing of the liquid crystal composition may include polymerizing the liquid crystal monomers.

The liquid crystal composition may further include a photoinitiator, and wherein the polymerizing of the liquid crystal monomers may include irradiating light.

The liquid crystal composition may have a thermotropic phase.

The liquid crystal composition may have a smectic B phase.

According to embodiments of the present disclosure, an alignment layer having a plurality of concave portions on its surface is made of a liquid crystalline material, and a dye is stably aligned through a nanoconfinement effect and molecular affinity. Thus, the polarizer can exhibit excellent polarization and absorbance characteristics.

The effects of the present disclosure are not limited to the above-described effects and other effects which are not described herein will become apparent to those skilled in the art from the following description.

BRIEF DESCRIPTION OF THE DRAWINGS

Features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims, and equivalents thereof.

It will be understood that when an element or layer is referred to as being "on," "connected to" or "coupled to" another element or layer, the element or layer can be directly on, connected or coupled to another element or layer, or intervening elements or layers may be present. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

The above and other aspects and features of the present disclosure will become more apparent by describing in more detail exemplary embodiments thereof with reference to the attached drawings, in which.

DETAILED DESCRIPTION

As used herein, the term "and/or" refers to any and all combinations of one or more of the associated listed items.

In the present description, a numerical range indicated by using "to" refers to a range including respective values presented before and after "to" as a minimum and a maximum, respectively.

As used herein, the term "polarizer" may refer to a coating-type thin film polarizer which is manufactured by coating a solution containing a polarizing material and the like and can be thinned, but the scope of the present disclosure is limited thereto.

As used herein, the term "dichroic" represents that the absorbance in one axial direction is different from the absorbance in the other axial direction.

A typical example of a polarizer includes a polarizing plate. The polarizing plate includes an iodine-polyvinyl alcohol film produced by stretching iodine-adsorbed polyvinyl alcohol (e.g., stretching an iodine-adsorbed polyvinyl alcohol raw film).

However, polyvinyl alcohol, which is a water-soluble polymer, is poor in water resistance and heat resistance, and iodine is also vulnerable to heat. Accordingly, when iodine is exposed to strong light or heat, the polarization characteristics of the polarizer may be lowered due to sublimation of iodine, which is problematic. Further, a manufacturing process including a stretching/pressing process is complicated, and an iodine-polyvinyl alcohol polarizing plate has a low mechanical strength and poor durability such that a bending defect or crack occurs when contraction is generated due to heat or moisture. Thus, the polarization characteristics may be deteriorated continuously. To overcome this disadvantage, there is an attempt to apply an additional protective film, which causes an increase in the thickness of the iodine-polyvinyl alcohol polarizer.

In order to replace such an iodine-polyvinyl alcohol polarizing plate, a technique has been developed for realizing polarization by aligning liquid crystal molecules to induce alignment of a dichroic dye. As a method of aligning liquid crystal molecules, for example, a rubbing alignment method in which liquid crystal molecules are aligned by forming scratches on the surface of a polymer such as polyimide, and a photo alignment method in which liquid crystal molecules are aligned through light irradiation have been studied.

However, in the rubbing alignment method, a defect may occur on the polymer surface or the dye during a process of physically forming the scratches, and the photo alignment method may cause a deviation in alignment due to chemical instability.

Hereinafter, embodiments of the present disclosure will be described with reference to the accompanying drawings.

Figure 1:
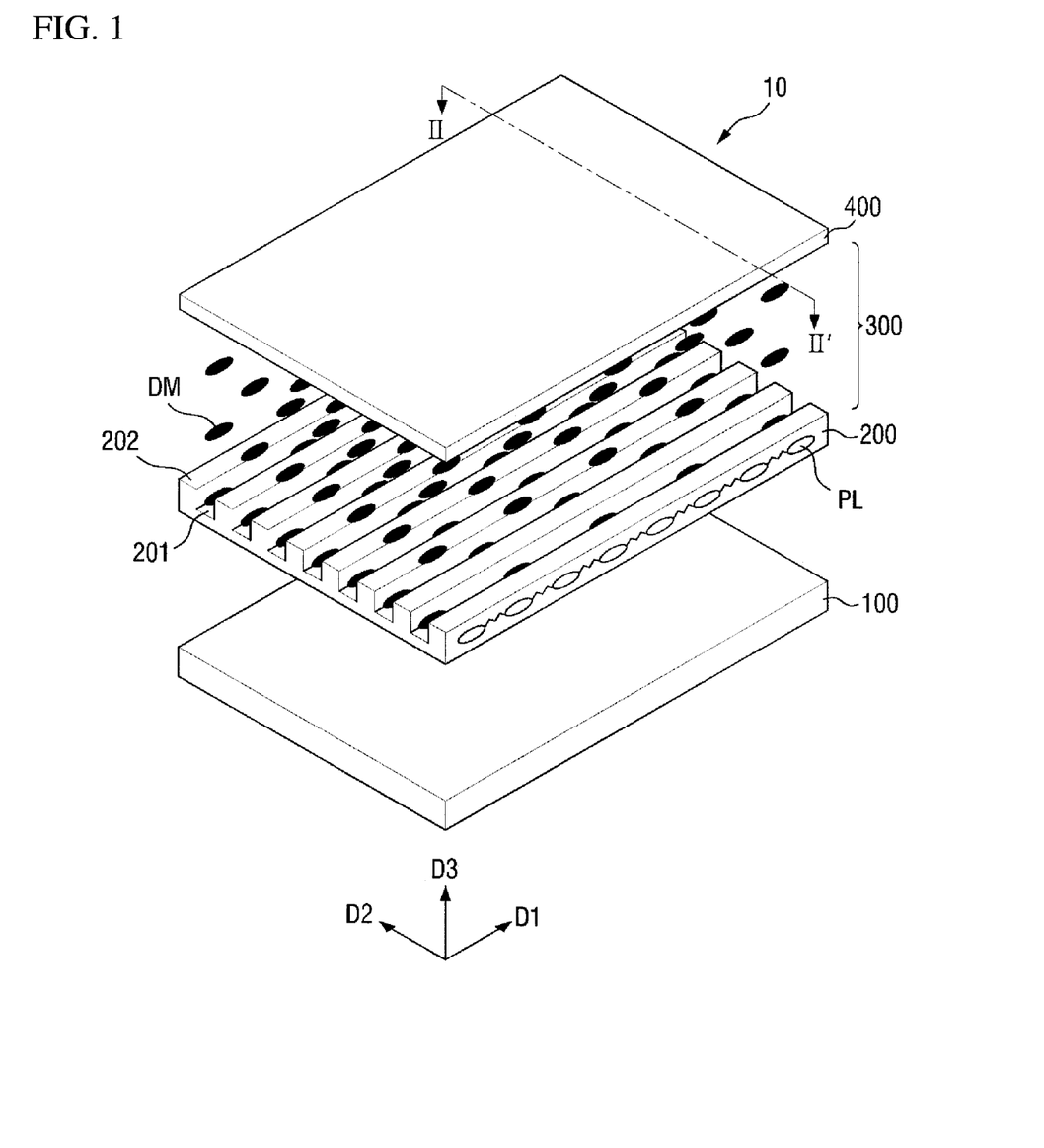
FIG. 1 is a perspective view of a polarizer according to an embodiment of the present disclosure.
Figure 2:
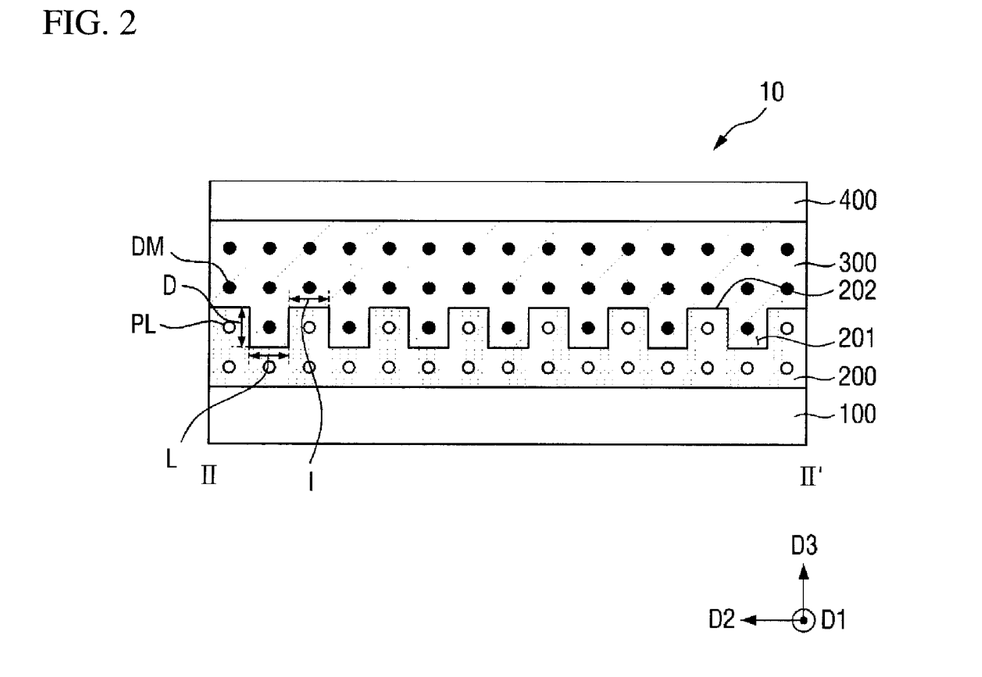
FIG. 2 is a cross-sectional view of the polarizer shown in FIG. 1 taken along the line II-II'.

FIG. 1 is a perspective view of a polarizer 10 according to an embodiment of the present disclosure. FIG. 2 is a cross-sectional view of the polarizer 10 shown in FIG. 1 taken along the line II-II'.

Referring to FIGS. 1 and 2, the polarizer 10 includes a base substrate 100, an alignment layer 200 disposed on the base substrate 100, a polarizing material layer 300 disposed on the alignment layer 200, and a protective layer 400 disposed on the polarizing material layer 300.

The base substrate 100 may provide a space (e.g., a surface) in which the alignment layer 200 can be disposed to support the components of the polarizer 10 including the alignment layer 200. The base substrate 100 may be a light transmitting substrate.

In an exemplary embodiment, the base substrate 100 may be a glass or plastic substrate disposed separately (e.g., separately from the other components of the polarizer) to support the components of the polarizer 10. However, the present disclosure is not limited thereto, and when the polarizer 10 of the present disclosure is applied to a display device, the components such as the alignment layer 200 may be directly disposed on the display device without the base substrate 100.

In other words, the polarizer 10 of the present disclosure may be provided in the form of a polarizing plate or a polarizing film including a separate base substrate 100, or may be directly disposed on a display device in the form of a coating layer to be integrated with the display panel.

The alignment layer 200 is disposed on the base substrate 100. A plurality of concave portions 201 and convex portions 202 may be defined (e.g., formed) on the surface of the alignment layer 200. The plurality of concave portions 201 and the plurality of convex portions 202 may be alternately arranged. The concave portion 201 may be a portion where a part of the surface of the alignment layer 200 is recessed in a vertical direction and the convex portion 202 may be a portion of the surface of the alignment layer 200 on which the concave portion 201 is not formed. Each of the concave portions 201 and the convex portions 202 may extend in a first direction D1, and the plurality of concave portions 201 and the plurality of convex portions 202 may be arranged in a second direction D2 perpendicular to the first direction D1.

A width L of each concave portion 201 may be 100 nm or less, and a depth D of each concave portion 201 may be 70 nm or more. The plurality of concave portions 201 may be arranged at an interval I of 100 nm or less and the interval I between the plurality of concave portions 201 may be constant (i.e., have a constant value throughout the polarizer). The width L of the concave portion 201 refers to a length of the concave portion 201 extending in the second direction D2 or the interval between two neighboring convex portions 202. The depth D of the concave portion 201 refers to a height from the bottom of the concave portion 201 to the top of the convex portion 202.

When the width L of each concave portion 201 is 100 nm or less, a dye DM can be efficiently aligned through nanoconfinement, and interference of light incident on the alignment layer 200 may not occur. Meanwhile, the width L of each concave portion 201 may be 10 nm or more, but the present disclosure is not limited thereto.

When the interval I between the concave portions 201 is 100 nm or less, the dye DM located on the region where the concave portions 201 are not formed can be effectively aligned, interference of light incident on the alignment layer 200 may not occur. Meanwhile, the interval I between the concave portions 201 may be 10 nm or more, but the present disclosure is not limited thereto.

The vertical cross section of each concave portion 201 may have a rectangular or square shape, but the present disclosure is not limited thereto and may have a triangular shape, a polygonal shape including a curve (e.g., at least one side that is curved), or the like. Further, the concave portions 201 may have substantially the same (e.g., the same) vertical cross-sectional shape. The vertical cross section refers to a cross section in a third direction D3 perpendicular to both the first direction D1 and the second direction D2.

The alignment layer 200 may contain a cured liquid crystalline material PL. For example, the alignment layer 200 may contain a material obtained by curing a liquid crystal composition containing liquid crystal monomers.

The liquid crystal monomer may be a reactive liquid crystal monomer (reactive mesogen) including a mesogen skeleton and a reactive end group. The cured liquid crystalline material PL may be a material formed by polymerizing reactive liquid crystal monomers having end groups capable of performing a polymerization reaction with each other by ultraviolet rays or heat. In this case, some unpolymerized reactive liquid crystal monomers may remain in the polarizing material layer 300, but the present disclosure is not limited thereto.

The reactive end groups of the liquid crystal monomers may contain an unsaturated bond such as a double or triple bond. For example, they may include, but not limited to, at least one of an allyl group (such as a vinyl group), an acryloyl group, a methacryloyl group and a heteroaryl group.

In an exemplary embodiment, the alignment layer 200 may be formed by polymerizing liquid crystal monomers by irradiating ultraviolet rays to a liquid crystal composition containing reactive liquid crystal monomers and a photoinitiator.

The liquid crystal monomers or the liquid crystal composition containing the liquid crystal monomers may be thermotropic liquid crystal having a liquid crystal phase under a specific temperature condition. The thermotropic liquid crystal may have, for example, a nematic phase, a smetic phase, a cholesteric phase, or the like. The liquid crystal monomers/composition may have a smectic phase, for example, a smectic B phase, but the present disclosure is not limited thereto.

The liquid crystal monomers/composition may have an anisotropic or chain-like liquid crystal phase, but the present disclosure is not limited thereto.

In an exemplary embodiment, the alignment layer 200 may be, but not limited to, a polymer of thermotropic liquid crystal monomers having reactive end groups.

The alignment layer 200 may be manufactured by attaching a mold having a plurality of convex portions to a liquid crystal composition and then curing the composition by irradiating light such as ultraviolet rays. The concave portions 201 on the surface of the alignment layer 200 may be formed by patterning through the convex portions of the mold. A more detailed description thereof will be described later.

The polarizing material layer 300 is disposed on the alignment layer 200. The polarizing material layer 300 may contain the dye DM.

The dye DM may be a dichroic dye. The dichroic dye may include an azo dye, an anthraquinone dye or an iodine dye. For example, the dichroic dye may include an azo dye. However, the present disclosure is not limited thereto, and other dyes, pigments, colorants and the like having dichroism may be utilized without limitation.

The dye DM may include at least one of a dye having a yellow color, a dye having a magenta color, and a dye having a cyan color. For example, the dichroic dye DM may include all of the yellow dye, the magenta dye and the cyan dye to be (e.g., appear) substantially black. However, the present disclosure is not limited thereto, and the dichroic dye DM may include at least one of a red dye, a green dye and a blue dye, and may represent a black color by including all of the red dye, the green dye and the blue dye.

The polarizing material layer 300 may not contain the liquid crystalline material PL which is contained in the alignment layer 200. Similarly, the alignment layer 200 may not contain the dye DM. That is, the alignment layer 200 and the polarizing material layer 300 may be formed as separate layers which are distinguished from each other. Accordingly, the material composition of the polarizer 10 according to the displacement in the thickness direction may be different between the alignment layer 200 and the polarizing material layer 300.

The dye DM may be aligned in a specific direction by the plurality of concave portions 201 formed in the alignment layer 200, thereby polarizing the light incident on the polarizing material layer 300. A detailed description thereof will be described later.

The thickness of the polarizing material layer 300 may be in a range of several micrometers to several tens of micrometers (μm), but the present disclosure is not limited thereto.

In an exemplary embodiment, the polarizing material layer 300 may further contain a solvent. The solvent may be, but not limited to, a hydrophobic solvent in which the dye DM is dissolved.

The protective layer 400 is disposed on the polarizing material layer 300. The protective layer 400 may be a layer which protects and/or encapsulates the dye DM contained in the polarizing material layer 300.

The protective layer 400 may include a water-soluble polymer material. In an exemplary embodiment, the protective layer 400 may include, but not limited to, polyvinyl alcohol (PVA), which is one of water-soluble polymer materials.

Because the dye DM constituting the polarizing material layer 300 and the solvent containing the dye DM are mostly hydrophobic, the protective layer 400 covering the polarizing material layer 300 may be made of a water-soluble hydrophilic polymer material, thereby effectively protecting the polarizing material layer 300 from being damaged.

Although not shown in the drawing, a functional film such as an additional protective film or a retardation film may be disposed on the protective layer 400. In addition, the above-mentioned functional film may be disposed below the base substrate 100 or between the respective layers in the polarizer 10.

Figure 3:
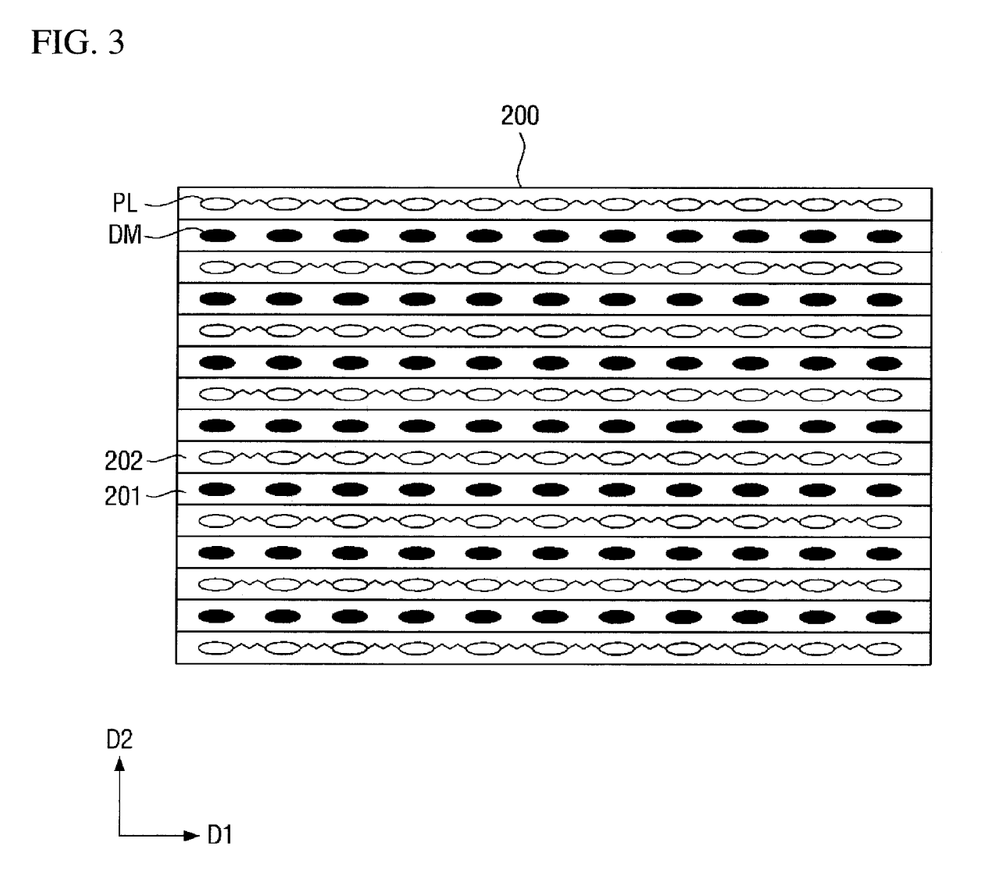
FIG. 3 is a plan view schematically showing a state in which polarizing materials are arranged on an alignment layer of the polarizer shown in FIG. 1.

FIG. 3 is a plan view schematically showing a state in which dye molecules (or particles) DM as a polarizing material are arranged on the alignment layer 200 of the polarizer 10 shown in FIG. 1.

Referring to FIG. 3, the plurality of concave portions 201 and the plurality of convex portions 202 extending in the first direction D1 are alternately arranged on the surface of the alignment layer 200 in the second direction D2 perpendicular to the first direction D1, and the dye DM is disposed on the alignment layer 200.

The dye molecules DM may be disposed in the concave portions 201 of the alignment layer 200 composed of the liquid crystal molecules PL. Because a space in which these dye molecules DM can be located is limited to the concave portions 201 having a narrow width of about 100 nm or less, the dye molecules DM are oriented in the extending direction (e.g., D1 direction) of the concave portions 201 to maintain a low energy state (physical effect).

Further, because the liquid crystalline material PL and the dye DM have similar structural characteristics of anisotropy, molecular affinity may be exerted between them. Accordingly, the dye DM in the concave portion 201 has a tendency to be oriented along the alignment direction of the convex portions 202 surrounding the concave portion 201 on both sides, i.e., the alignment direction of the cured liquid crystal molecules PL (chemical effect). Meanwhile, the cured liquid crystal molecules PL may be oriented along the extending direction of the concave portions 201 in a process of forming a pattern of the concave portions 201 having a narrow width.

Because the dye DM has a dichroic property to absorb a polarized component parallel to one axial direction and transmit a polarized component perpendicular thereto, the dye DM aligned in a specific direction also polarizes incident light in the specific direction due to the above-described physical effect and chemical effect.

Although not shown in the drawing (i.e., FIG. 3), the dye molecules DM may be disposed on the convex portions 202 or on an upper portion apart from the surface of the alignment layer 200, and the dye molecules DM also have a tendency to be oriented in the same direction as the dye molecules DM aligned in the concave portions 201 to maintain a low energy state.

The polarizer 10 of the present disclosure can easily and stably orient the dichroic dye DM through the alignment layer 200, thereby polarizing incident light in a specific direction.

Figure 4:
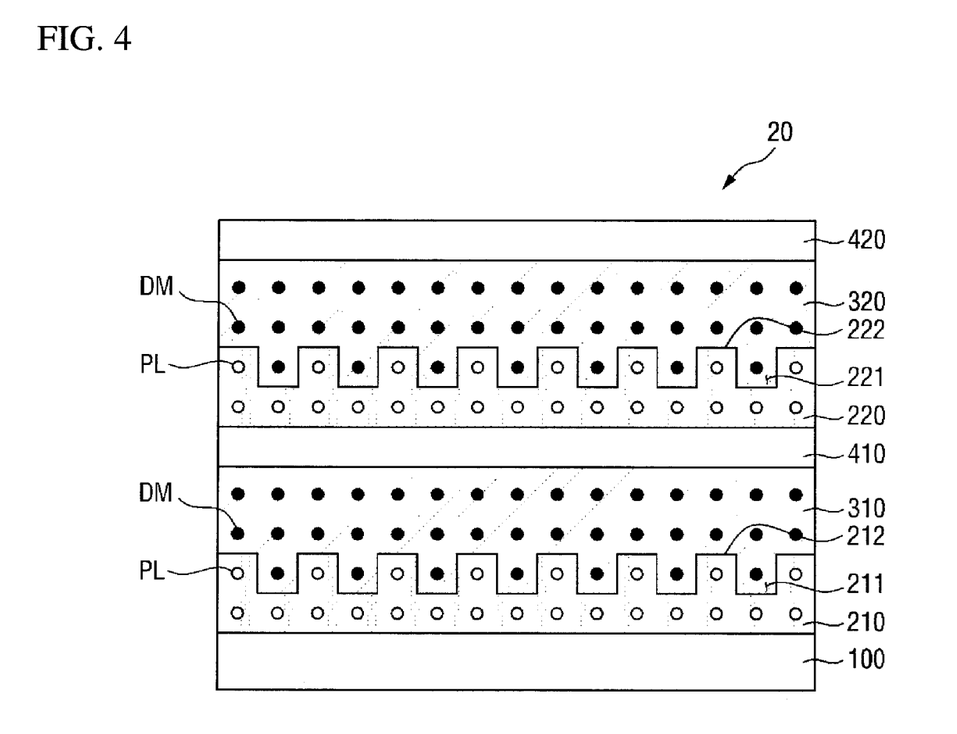
FIG. 4 is a cross-sectional view of a polarizer according to an embodiment of the present disclosure.

FIG. 4 is a cross-sectional view of a polarizer 20 according to another embodiment of the present disclosure.

The polarizer 20 of FIG. 4 is substantially the same as that described with reference to FIG. 1 except that polarizers are stacked in multiple stages. Hereinafter, a redundant description will be omitted.

Referring to FIG. 4, a first alignment layer 210, a first polarizing material layer 310 and a first protective layer 410 are sequentially stacked on the base substrate 100 (forming a first stage). Further, a second alignment layer 220, a second polarizing material layer 320 and a second protective layer 420 are sequentially stacked on the first protective layer 410 (forming a second stage).

The first and second alignment layers 210 and 220, the first and second polarizing material layers 310 and 320 and the first and second protective layers 410 and 420 may be substantially the same as the alignment layer 200, the polarizing material layer 300 and the protective layer 400 described with reference to FIG. 1, respectively. That is, each of the first and second alignment layers 210 and 220 may also include a plurality of concave portions 211 and 221 and convex portions 212 and 222 and a liquid crystalline material PL. The first and second polarizing material layers 310 and 320 may contain the dye DM, and the first and second protective layers 410 and 420 may contain a water-soluble polymer material.

Here, because not only the first and second polarizing material layers 310 and 320 but also the first and second alignment layers 210 and 220 may be hydrophobic, when the first protective layer 410 disposed between the first polarizing material layer 310 and the second alignment layer 220 is made of a water-soluble polymer material, it is possible to effectively prevent (or substantially prevent) the members from being damaged in a process of manufacturing the polarizer 20 by preventing (or substantially preventing) the first polarizing material layer 310 and the second alignment layer 220 from being in direct contact with each other.

The first concave portions 211 and the first convex portions 212 formed on the first alignment layer 210 may be aligned in the substantially the same (e.g., the same) pattern as the second concave portions 221 and the second convex portions 222 formed on the second alignment layer 220. That is, the first concave portions 211 and the first convex portions 212 may be completely overlapped with the second concave portions 221 and the second convex portions 222, respectively. When the concave portions 211 and 221 and the convex portions 212 and 222 of the first and second alignment layers 210 and 220 are arranged at the same positions (e.g., overlap perfectly in the thickness direction), the first polarizing material layer 310 and the second polarizing material layer 320 can polarize light in the same direction.

If the polarizer is formed of a single layer, the absorbance and the polarization for some or all of the wavelengths may not be sufficient. However, as shown in FIG. 4, by arranging the polarizers including the first and second alignment layers 210 and 220 and the first and second polarizing material layers 310 and 320 in multiple stages, the absorbance and the polarization can be improved.

The dye DM contained in the first polarizing material layer 310 and the dye DM contained in the second polarizing material layer 320 may be the same kind of materials, but the present disclosure is not limited thereto, and the first polarizing material layer 310 and the second polarizing material layer 320 may be composed of dyes having different colors as described later.

FIG. 4 shows a case where the polarizers including the first and second alignment layers 210 and 220 and the first and second polarizing material layers 310 and 320 are stacked in two stages. However, the present disclosure is not limited thereto, and the polarizers may be stacked in three or more stages as needed to improve the absorbance and the degree of polarization to a desired level.

Figure 5:
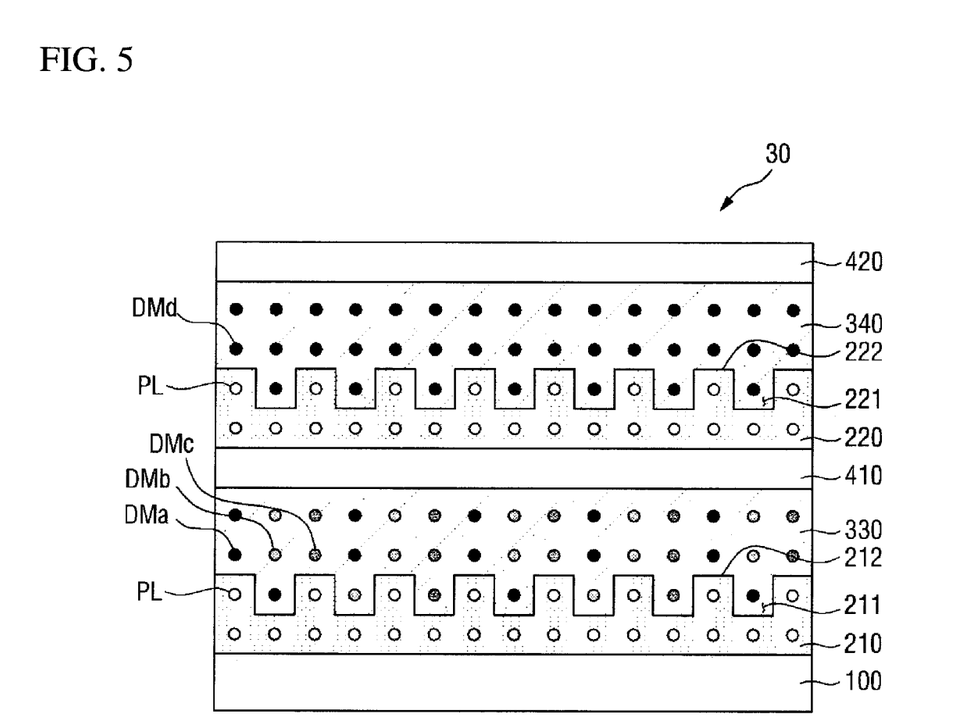
FIG. 5 is a cross-sectional view of a polarizer according to an embodiment of the present disclosure.

FIG. 5 is a cross-sectional view of a polarizer 30 according to still another embodiment of the present disclosure.

The polarizer 30 of FIG. 5 is substantially the same as that described with reference to FIG. 4 except that the dye DM contained in a first polarizing material layer 330 and the dye DM contained in a second polarizing material layer 340 are different from each other. Hereinafter, a redundant description will be omitted.

Referring to FIG. 5, the first polarizing material layer 330 contains a first dye DMa, a second dye DMb and a third dye DMc, and the second polarizing material layer 340 contains a fourth dye DMd. All of the first to fourth dyes DM may be dichroic dyes.

The first to third dyes DMa, DMb and DMc may be different materials, for example, dyes having different colors.

For example, the first to third dyes DMa, DMb and DMc may be a red dye, a green dye, and a blue dye, respectively. Alternatively, the first to third dyes DMa, DMb and DMc may be a yellow dye, a magenta dye and a cyan dye, respectively.

The fourth dye DMd may be the same dye as one of the first to third dyes DMa, DMb and DMc. Further, the fourth dye DMd may contain the same dye as at least one of the first to third dyes DMa, DMb and DMc. However, the present disclosure is not limited thereto, and the fourth dye DMd may be a dye different from the first to third dyes DMa, DMb and DMc.

The fourth dye DMd may be a dye which absorbs visible light having a long wavelength. The term "long wavelength" may refer to a wavelength in a range of about 560 to 780 nm which emits red light in a visible light range. However, the term "long wavelength" is not limited thereto, and may refer to a range of relatively long wavelengths as compared with the wavelengths absorbed by the first to third dyes DMa, DMb and DMc. For example, the fourth dye DMd may be a dye having a cyan color or a blue dye, but the present disclosure is not limited thereto.

In an exemplary embodiment, the first to third dyes DMa, DMb and DMc may be a yellow dye, a magenta dye, and a cyan dye, respectively, and the fourth dye DMd may be a cyan dye. However, the present disclosure is not limited thereto.

Even if the polarizing material layer contains each of the dyes which absorb visible light of a short wavelength, a medium wavelength and a long wavelength at the same ratio, the absorbance of the long wavelength band may be relatively decreased, and there is a limit to increase only the dye which absorbs long wavelength light in a single layer due to a solubility problem. However, as shown in FIG. 5, when the polarizing material layer 340, which absorbs relatively long wavelength light, is additionally disposed, the absorbance for the long wavelength band can be compensated.

FIG. 5 shows a case where the first to third dyes DMa, DMb and DMc are contained in the first polarizing material layer 330 and the fourth dye DMd is contained in the second polarizing material layer 340, but the present disclosure is not limited thereto. The order may be changed such that the fourth dye DMd is contained in the first polarizing material layer 330 and the first to third dyes DMa, DMb and DMc are contained in the second polarizing material layer 340.

Figure 6:
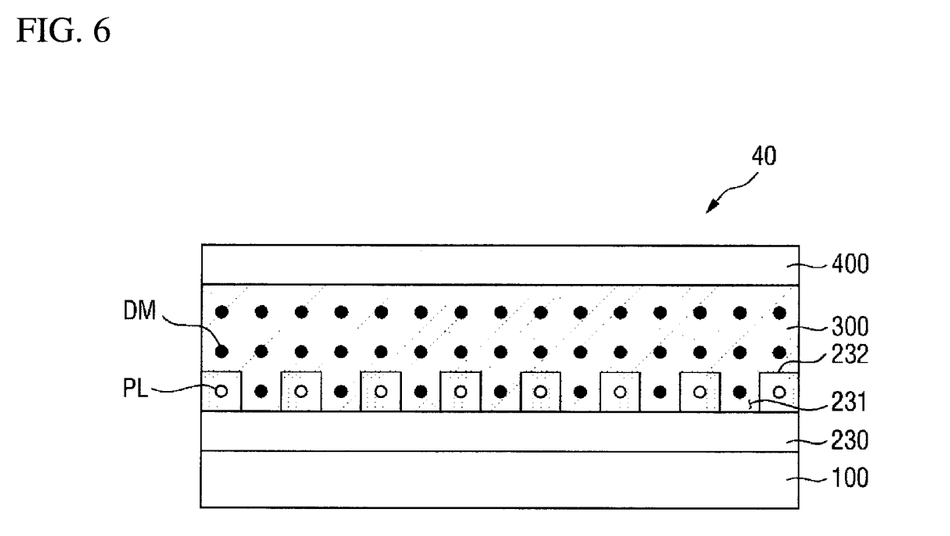
FIG. 6 is a cross-sectional view of a polarizer according to an embodiment of the present disclosure.

FIG. 6 is a cross-sectional view of a polarizer 40 according to still another embodiment of the present disclosure.

The polarizer 40 of FIG. 6 is substantially the same as that described with reference to FIG. 1 except that separate convex portions 232 are disposed on the alignment layer 230. Hereinafter, a redundant description will be omitted.

Referring to FIG. 6, a plurality of convex portions 232 are separately disposed on the surface of the alignment layer 230, and concave portions 231 are defined by a space between neighboring convex portions 232. In other words, unlike the polarizer of FIG. 1 in which the convex portions 202 and the concave portions 201 are formed directly and integrally on the surface of the alignment layer 200, the polarizer of FIG. 6 may have a structure in which a plurality of convex portions 232 are separately disposed on the surface of the flat alignment layer 230.

In this case, the plurality of convex portions 232 and the alignment layer 230 may be made of different materials. For example, the plurality of convex portions 232 may include a cured liquid crystalline material, while the alignment layer 230 may not include a cured liquid crystalline material. However, the present disclosure is not limited thereto.

The width of each convex portion 232 and the interval between the plurality of convex portions 232 may be 100 nm or less, which may mean that the width of each concave portion 231 and the interval between the plurality of concave portions 231 are 100 nm or less.

When the width of each concave portion 231 and the interval between the plurality of concave portions 231 are 100 nm or less, the alignment is achieved effectively through nanoconfinement of the dye molecules DM. As described above, it is possible to effectively align the dye molecules DM located on a region where the concave portions 231 are not formed, without interference of light incident on the alignment layer 230. Similarly, the width of each concave portion 231 and the interval between the plurality of concave portions 231 may be 10 nm or more, but the present disclosure is not limited thereto.

The polarizer 40 of FIG. 6 may also be configured such that the polarizers are stacked in multiple stages as shown in FIG. 4. In this case, each polarizing material layer 300 may include a different dye as shown in FIG. 5.

Figure 7:
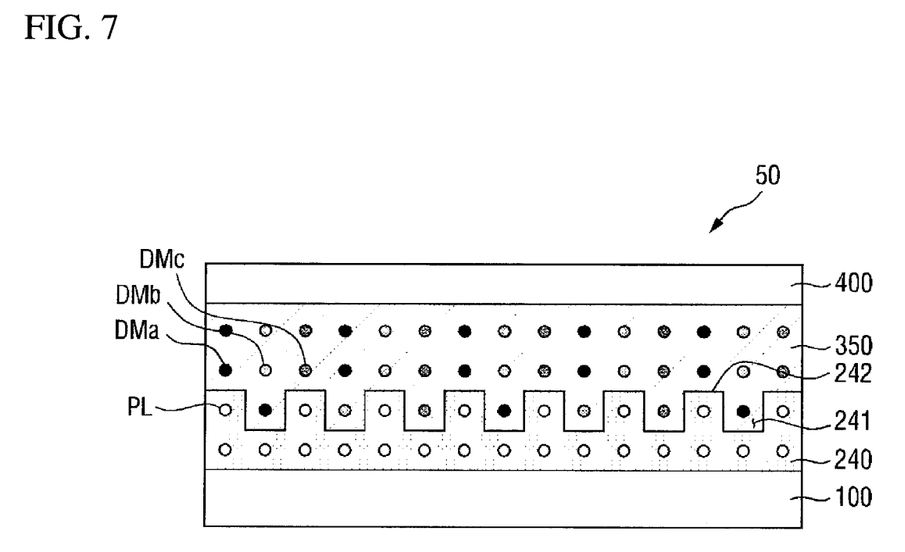
FIG. 7 is a cross-sectional view of a polarizer according to an embodiment of the present disclosure.

FIG. 7 is a cross-sectional view of a polarizer 50 according to still another embodiment of the present disclosure.

The polarizer 50 of FIG. 7 is substantially the same as that described with reference to FIG. 1 except that a polarizing material layer 350 contains a plurality of dyes DMa, DMb and DMc. That is, the polarizer 50 of FIG. 7 has substantially the same structure as a polarizer in which the second alignment layer 220 and the second polarizing material layer 340 are omitted from the polarizer 30 of FIG. 5. Because the dyes DMa, DMb and DMc contained in the polarizing material layer 350 of FIG. 7 are as described above with reference to FIG. 5, a detailed description thereof will not be repeated.

FIGS. 8 to 13 are cross-sectional views illustrating acts of a method of manufacturing the polarizer 10 shown in FIGS. 1 and 2.

Figure 8:
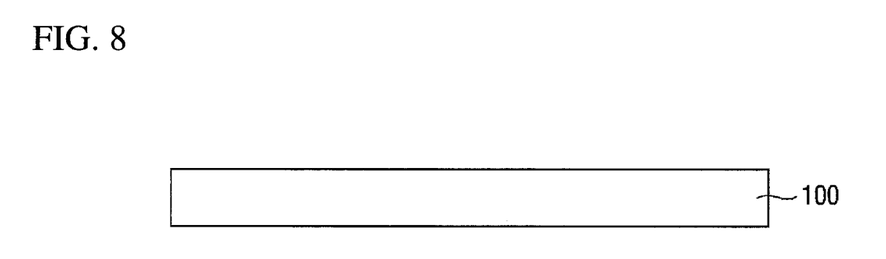
FIGS. 8 to 13 are cross-sectional views illustrating acts of a manufacturing method of the polarizer shown in FIGS. 1 and 2.
Figure 9:
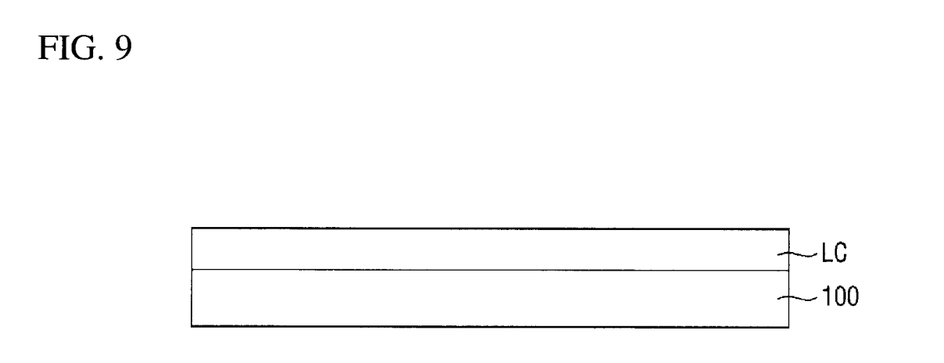

First, referring to FIGS. 8 and 9, a liquid crystal composition LC is applied onto a base substrate 100. The liquid crystal composition LC is a mixture containing a curable liquid crystalline material, and may contain, for example, liquid crystal monomers having reactive end groups. The liquid crystal composition LC may further contain a photoinitiator, a solvent, a cross-linking agent, and the like.

Figure 10:
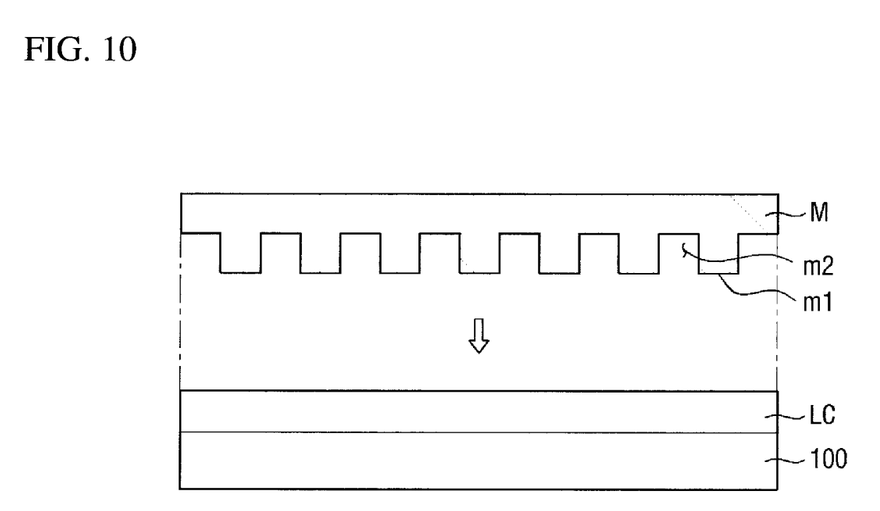

Then, referring to FIG. 10, a mold M having a plurality of convex portions m1 and concave portions m2 formed on its surface is attached to the liquid crystal composition LC. The mold M may be attached such that the surface on which the convex portions m1 and the concave portions m2 are formed is in contact with the liquid crystal composition LC. Because the liquid crystal composition LC has predetermined or set fluidity in a state before being cured, it may be attached so as to fill the concave portions m2 of the mold M.

Because the concave portions m2 of the mold have a narrow width, the liquid crystal molecules of the liquid crystal composition LC filled in the concave portions m2 may be oriented in the extending direction of the concave portions m2 to maintain a low energy state.

Each of the convex portions m1 and the concave portions m2 may extend in one direction, and the plurality of convex portions m1 and the plurality of convex concave portion m2 may be alternately arranged.

The mold M may be made of a silicon (Si) material (e.g., a silicone material), but the present disclosure is not limited thereto. The mold M may be made of a material having a low surface energy with respect to the liquid crystal composition LC, or the surface of the mold M may be coated with the material (having a low surface energy).

Figure 11:
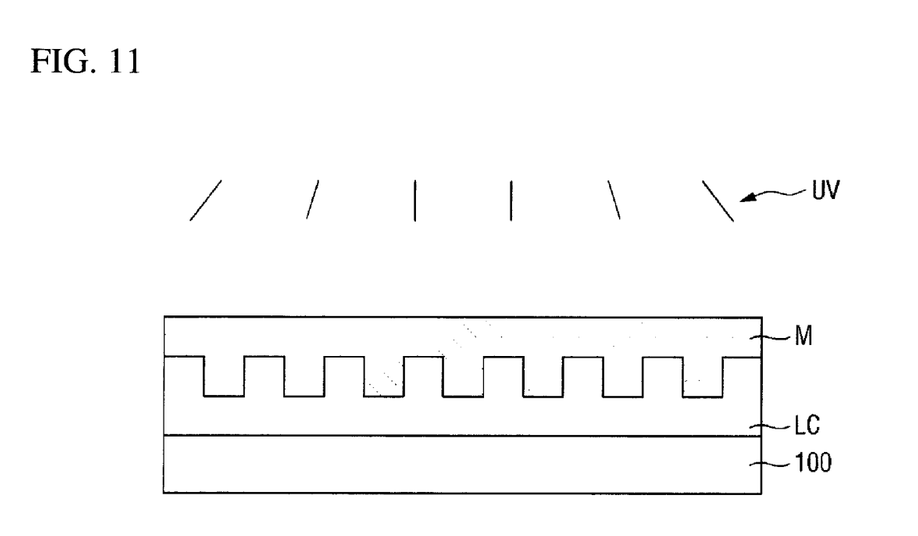

Then, referring to FIG. 11, the liquid crystal composition LC is cured by irradiating ultraviolet (UV) rays to the liquid crystal composition LC attached to the mold M. The photoinitiator contained in the liquid crystal composition LC is responsive to ultraviolet (UV) rays and may initiate a polymerization reaction of the liquid crystal monomers, and the liquid crystal monomers may form a polymer through the reactive end groups. Accordingly, the liquid crystal composition LC may be cured.

Here, the liquid crystal molecules filling the concave portions m2 of the mold M may be cured in a state of being oriented in the extending direction of the concave portions m2.

In FIG. 11, the liquid crystal composition LC is exemplified as a material which is cured by ultraviolet (UV) rays, but the present disclosure is not limited thereto. The liquid crystal composition LC may be cured by wavelengths other than ultraviolet (UV) wavelengths, or may be cured by conditions such as heat and solvent other than light.

When the liquid crystal composition LC is a substance that is cured by light irradiation, a curing process can be performed at room temperature without requiring additional heat. Therefore, it is possible to prevent or substantially prevent the dye DM and the like contained in the polarizing material layer 300 from being damaged by heat, which is particularly desirable (e.g., advantageous) when the polarizers are formed in multiple stages.

Figure 12:
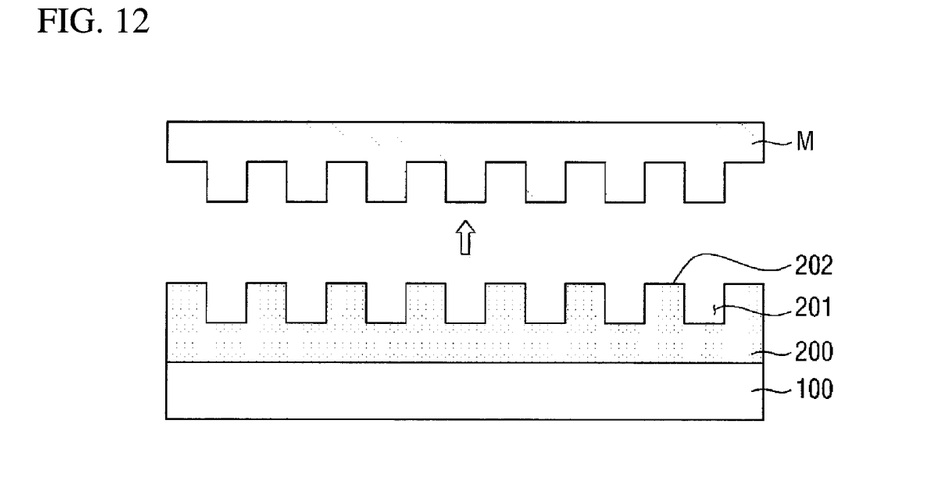

Then, referring to FIG. 12, the mold M is detached from the cured liquid crystalline material PL. The mold M can be easily detached from the cured liquid crystalline material PL when the surface of the mold M is formed with a low surface energy with respect to the liquid crystal composition LC.

The cured liquid crystalline material PL may be formed to have a plurality of concave portions 201 at positions corresponding to the convex portions m1 of the mold M and a plurality of concave portions 201 at positions corresponding to the concave portions m2 of the mold M, and may be utilized as the alignment layer 200 of the present disclosure.

Figure 13:
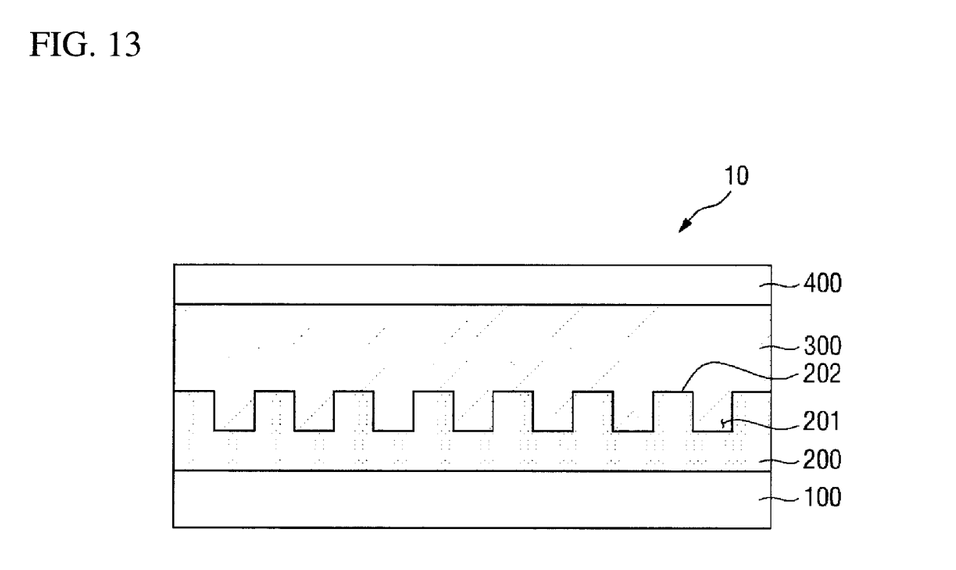

Then, referring to FIG. 13, the polarizing material layer 300 is formed by coating a solution containing the dye DM on the alignment layer 200, and the protective layer 400 is formed thereon, thereby manufacturing the polarizer 10 as shown in FIG. 1.

While the present invention has been particularly illustrated and described with reference to exemplary embodiments thereof, it will be understood by those of ordinary skill in the art that various changes in form and detail may be made therein without departing from the spirit and scope of the present invention as defined by the following claims, and equivalents thereof. The exemplary embodiments should be considered in a descriptive sense only and not for purposes of limitation.

What is claimed is:

1. A polarizer comprising:
    an alignment layer comprising a cured liquid crystalline material and having a surface comprising a plurality of concave portions, the plurality of concave portions extending in a first direction; and
    a polarizing material layer comprising a dye on the concave portions of the surface of the alignment layer, wherein the cured liquid crystalline material of the alignment layer and the dye of the polarizing material layer each have structural characteristics of anisotropy.

2. The polarizer of claim 1, wherein the cured liquid crystalline material comprises a polymer of liquid crystal monomers.

3. The polarizer of claim 2, wherein the liquid crystal monomers comprise reactive end groups comprising an unsaturated bond.

4. The polarizer of claim 1, wherein the alignment layer does not comprise a dye.

5. The polarizer of claim 1, wherein the polarizing material layer does not comprise the cured liquid crystalline material.

6. The polarizer of claim 1, wherein the dye comprises a dichroic dye.

7. The polarizer of claim 1, wherein each of the concave portions has a width of 100 nm or less.

8. The polarizer of claim 1, wherein each of the concave portions has a depth of 70 nm or more.

9. The polarizer of claim 1, wherein the plurality of concave portions are arranged at regular intervals in a second direction perpendicular to the first direction.

10. The polarizer of claim 9, wherein an interval between the plurality of concave portions is 100 nm or less.

* * * * *